(12) United States Patent
Aykroyd et al.

(10) Patent No.: US 11,980,143 B2
(45) Date of Patent: May 14, 2024

(54) VENTILATION AND LIGHTING DEVICE

(71) Applicant: Intelligent Growth Solutions Limited, Dundee (GB)

(72) Inventors: Henry Aykroyd, Dundee (GB); David Scott, Dundee (GB); Niall Alexander Skinner, Dundee (GB)

(73) Assignee: Intelligent Growth Solutions Limited, Dundee (GB)

( * ) Notice: Subject to any disclaimer, the term of this patent is extended or adjusted under 35 U.S.C. 154(b) by 0 days.

(21) Appl. No.: 17/847,953

(22) Filed: Jun. 23, 2022

(65) Prior Publication Data

US 2022/0312686 A1 Oct. 6, 2022

Related U.S. Application Data

(63) Continuation of application No. 17/057,859, filed as application No. PCT/GB2019/051434 on May 24, 2019, now Pat. No. 11,399,471.

(30) Foreign Application Priority Data

May 25, 2018 (GB) .................................. 1808664.5

(51) Int. Cl.
*A01G 7/04* (2006.01)
*A01G 7/02* (2006.01)
(Continued)

(52) U.S. Cl.
CPC ............... *A01G 7/045* (2013.01); *A01G 7/02* (2013.01); *A01G 9/18* (2013.01); *A01G 9/249* (2019.05); *F21S 4/28* (2016.01); *F21Y 2115/10* (2016.08)

(58) Field of Classification Search
CPC . A01G 7/045; A01G 7/02; A01G 9/18; A01G 9/249; F21S 4/28; F21Y 2115/10
See application file for complete search history.

(56) References Cited

U.S. PATENT DOCUMENTS 4,914,858 A * 4/1990 Nijssen .................. A01G 7/045
47/60
6,680,200 B2 * 1/2004 Everett .................. A01G 31/06
435/284.1

(Continued)

FOREIGN PATENT DOCUMENTS

CN 102811606 A 12/2012
CN 204616544 U 9/2015
(Continued)

OTHER PUBLICATIONS

UK IPO Search Report for Application No. GB 1808664.5, dated Nov. 23, 2018.
(Continued)

*Primary Examiner* — Tsion Tumebo
(74) *Attorney, Agent, or Firm* — MOSER TABOADA

(57) ABSTRACT

An apparatus for use in indoor agriculture is provided, the apparatus comprising a plurality of elongate supports connected to at least one common manifold. Each elongate support within the plurality of elongate supports comprising: a main body having a first side; at least one inlet in fluid communication with the at least one common manifold; a plurality of outlets; and a channel within and extending along substantially the length of the main body between the at least one inlet and the plurality of outlets. The at least one common manifold is configured to allow gas to flow into the at least one inlets of the plurality of elongate supports, wherein the apparatus is configured such that during use, gas may flow from the common manifold to the at least one inlet of each elongate support within the plurality of elongate supports, through the channel of each elongate support and out of the plurality of outlets of each elongate support, such that a uniform flow of gas is provided adjacent the first side of the main body during use.

14 Claims, 8 Drawing Sheets

(51) Int. Cl.
*A01G 9/18* (2006.01)
*A01G 9/24* (2006.01)
*F21S 4/28* (2016.01)
*F21Y 115/10* (2016.01)

(56) References Cited

U.S. PATENT DOCUMENTS

| | | | |
|---|---|---|---|
| 8,651,704 B1* | 2/2014 | Gordin | F21V 29/60 |
| | | | 362/373 |
| 9,974,252 B2 | 5/2018 | Aykroyd et al. | |
| 10,624,275 B1* | 4/2020 | Lewis | A01G 9/247 |
| 2003/0162288 A1 | 8/2003 | Everett | |
| 2010/0126063 A1 | 5/2010 | Emoto | |
| 2011/0220224 A1* | 9/2011 | Ellis | F16L 39/06 |
| | | | 137/561 A |
| 2014/0017043 A1 | 1/2014 | Hirai et al. | |
| 2014/0283452 A1 | 9/2014 | Dittman | |
| 2015/0282437 A1 | 10/2015 | Ohara et al. | |
| 2015/0282444 A1* | 10/2015 | Butler | A01G 31/06 |
| | | | 47/62 C |
| 2016/0234967 A1* | 8/2016 | Choi | H05K 7/20927 |
| 2016/0295820 A1* | 10/2016 | Aykroyd | A01G 9/249 |
| 2016/0338276 A1 | 11/2016 | Speidell et al. | |
| 2017/0027112 A1 | 2/2017 | Vail et al. | |
| 2018/0042192 A1* | 2/2018 | Volpe | A01G 31/04 |
| 2018/0263195 A1 | 9/2018 | Hutto | |
| 2018/0325038 A1* | 11/2018 | Spiro | A01G 9/045 |
| 2019/0230876 A1 | 8/2019 | Lyssa | |
| 2020/0229357 A1* | 7/2020 | Spiro | A01G 9/247 |

FOREIGN PATENT DOCUMENTS

| | | |
|---|---|---|
| CN | 210247624 U | 4/2020 |
| CN | 111124005 A | 5/2020 |
| CN | 111836538 A | 10/2020 |
| EP | 2549855 B1 | 3/2014 |
| FR | 2621448 A1 | 4/1989 |
| JP | S 54-60150 A | 5/1979 |
| JP | 2012125196 A | 7/2012 |
| JP | 2013-500042 A | 1/2013 |
| JP | 2013-521824 A | 6/2013 |
| JP | 2013106600 A | 6/2013 |
| JP | 5839171 B2 | 1/2016 |
| JP | 2016-539662 A | 12/2016 |
| JP | 2019-118874 A | 7/2019 |
| JP | 2020018229 A | 2/2020 |
| KR | 101053146 B1 | 8/2011 |
| KR | 1020120021050 | 3/2012 |
| KR | 101531385 B1 | 6/2015 |
| KR | 2018/0026304 A | 3/2018 |
| KR | 101951922 B1 | 2/2019 |
| WO | WO 2012/050067 A1 | 4/2012 |
| WO | WO-2017/024079 A2 | 2/2017 |
| WO | WO-2017/024079 A3 | 2/2017 |
| WO | WO 2019040863 A1 | 2/2019 |
| WO | WO-2019/208279 A1 | 10/2019 |

OTHER PUBLICATIONS

International Search Report for Application No. PCT/GB2019/051434, dated Aug. 21, 2019.

Office Action in Chinese Patent Application 201980034572.2 dated Dec. 28, 2021.

This Farm of the Future Uses No Soil and 95% Less Water, Jul. 5, 2016, https://www.youtube.com/watch?app=desktop&v=tvJUHnmU; last viewed Mar. 3, 2023.

Office Action in Chinese Patent Application 2020-563504 dated Feb. 5, 2023.

\* cited by examiner

VENTILATION AND LIGHTING DEVICE

CROSS-REFERENCE TO RELATED APPLICATIONS

This application is a continuation of U.S. patent application Ser. No. 17/057,859, filed Nov. 23, 2020, which is the National Stage of PCT/GB2019/051434 filed May 24, 2019, which claims priority to U.K. Patent Application 1808664.5 filed May 25, 2018, the entire contents of each of which are incorporated herein by reference.

FIELD OF THE INVENTION

The present invention relates to the field of lighting and gas delivery supports for the use in indoor farming, and to systems using the same.

BACKGROUND OF THE INVENTION

A particular feature of indoor farming is the requirement to grow as many plants as possible in a given space. Therefore, systems are typically stacked vertically or horizontally with as high a density of plants, or fungi etc., as possible. This high density growing leads to difficulty in providing uniform ventilation, temperature, and particularly $CO_2$. However, the precise control of ventilation, temperature and $CO_2$ is very important, and particularly temperature differences of 1 or 2 degrees can be very significant. Similarly, the control of $CO_2$ can be critical to plant growth and this must be constant throughout the facility and particularly beside each leaf. It is therefore logical that a system must be designed to deliver $CO_2$ directly to each plant. It is also important to note that since plants release oxygen that this must be removed to allow the $CO_2$ to enter the leaf. Thus, very precise and local control of air movement and ventilation is critical.

Therefore, there remains a need for improved ways to deliver $CO_2$ to high density plants.

The introduction of LEDs has allowed the development of indoor farming systems. LEDs are particularly suited to high density growing since they can be placed in close proximity to the crop, in some situations this can be as close as 5 cm but is typically 15-25 cm. As LEDs become more efficient in the conversion of electrical energy to radiant energy the adoption of indoor growing systems continues to expand from high value low volume crops to lower value higher volume products that are typically grown in greenhouses. This new technology allows the control of all aspects of growth; temperature, humidity, $CO_2$, light by wavelength, water, nutrition and has been called total control environment agriculture (TCEA). The introduction of automation into TCEA systems has reduced the costs of growing, however power remains the largest single cost. Therefore, achieving the highest level of efficiency from the LEDs is critically important. The efficiency of an LED can be improved by cooling the LED and this also extends the life of the LED.

A particular feature of TCEA indoor growing is the amount of light and thus the quantity of LEDs required. This is typically 5-20 or more times the quantity of light used in commercial buildings. Therefore, the quantity of heat produced is proportionately greater. Therefore, cooling systems have been developed. One particular example is the use of chilled water flowing through tubes in close proximity to the LEDs. Whilst this is efficient, it is typically expensive, difficult to maintain and causes condensation on the tubes. Another approach is to use aluminium heat sinks containing a large number of cooling fins, these require significant quantities of cool air to be passed over the fins and this can change the temperature and humidity of the growing environment near the plant, fungi or algae.

The control of temperature is critical to the performance and the life of LEDs. Recently the efficiency of LEDs as measured by electrical power to radiant power has increased to over 50%. However, the remaining 50% is heat. A particular problem is that this heat is generated inside the diode and is measured by the junction temperature. The efficiency of the LED is provided by the manufacturers' data sheets and shows the variation from 25 degrees Celsius and typically this can be improved at temperatures below zero Celsius by 2.5 to 7.5% and will be reduced by 2.5 to 15% at temperatures above 70 degrees Celsius. Since indoor farming systems typically operate between 18 and 25 degrees Celsius the challenge is to remove the heat from the centre of the diode using the ambient air.

Known cooling systems in the art include water cooling LED heat sinks and these are relatively expensive and add significant complexity to the growing system and are prone to condensation.

Therefore, there remains a need for improved ways to cool LEDs.

SUMMARY OF THE INVENTION

According to a first aspect of the invention there is provided an apparatus for use in indoor agriculture, the apparatus comprising a plurality of elongate supports connected to at least one common manifold, each elongate support within the plurality of elongate supports comprising:
  a main body having a first side;
  at least one inlet in fluid communication with the common manifold;
  a plurality of outlets; and
  a channel within and extending along substantially the length of the main body between the at least one inlet and the plurality of outlets,
  the at least one common manifold configured to allow gas to flow into the at least one inlet of the plurality of elongate supports,
  wherein the apparatus is configured such that during use, gas may flow from the common manifold to the at least one inlet of each elongate support within the plurality of elongate supports, through the channel of each elongate support and out of the plurality of outlets of each elongate support, such that a uniform flow of gas is provided adjacent the first side of the main body during use.

In some embodiments, the cross-sectional area of the channel of the main body is significantly larger than that of each outlet of the plurality of outlets. For example, the cross-sectional area of the channel may be 10 times, 12 times, 15 times, 20 times, 25 times, or 30 times greater than that of each outlet of the plurality of outlets. The cross-sectional area of the channel may be at least 10 times greater than that of each outlet of the plurality of outlets, at least 15 times greater than that of each outlet of the plurality of outlets, or at least 20 times greater than that of each outlet of the plurality of outlets.

It has been found that by having the cross-sectional area of the channel of the main body to be significantly larger than that of each outlet of the plurality of outlets, that the gas flow from each outlet of the plurality of outlets is substantially uniform along the length of the main body.

In some embodiments, the cross-sectional area of the outlets within the plurality of outlets of a given elongate support may change along the length of the main body. For example, the cross-sectional area of the outlets may increase along the length of the main body. For example, in embodiments where the inlet is located at the proximal end of the main body, the cross-sectional area of the outlets may increase along the length of the main body going proximal to distal (i.e. away from the inlet). Accordingly, the flow of gas from the plurality of outlets for a given elongate support may be substantially uniform along the length of the main body.

The outlets may have a diameter of 3 to 8 mm. The outlets may have a diameter of 4 to 5 mm. The outlets may be arranged on the first side of the main body. The outlets may be arranged on a second and/or third side adjacent to the first side. For example, the main body may have a rectangular cross-section and the first side may be the bottom side of the rectangular cross-section, with the outlets arranged on one or both of second and third sides of the rectangular cross-section adjacent either side of the bottom first side. In another example, the main body may have an elliptical cross-section, and the first side may be one of the portions of the elliptical cross-section with the smallest curvature, and the second and third sides may be the portions of the elliptical cross-section having the greatest curvature. The outlets may be arranged on one or both of the second and third sides. Alternatively, the first side may be one of the portions of the elliptical cross-section with the greatest curvature, and the second and third sides may be portions of the elliptical cross section with the smallest curvature. The outlets may be arranged on one or both of the second and third sides.

The at least one inlet of each elongate support may comprise a valve. Accordingly, the rate of gas flow through each elongate support may be independently controlled such that the rate of gas flow can be varied per elongate support.

Typically, the main body comprises a metallic material. For example, the main body may comprise copper, brass, iron, steel, aluminium, or similar. Preferably, the main body comprises aluminium.

In some embodiments, the main body comprises a hollow metallic tube. The hollow metallic tube may have a circular, elliptical, trapezoidal or rectangular cross-section. Accordingly, the channel extending along substantially the length of the main body between the inlet and the plurality of outlets may be the lumen of the tubular main body.

In some embodiments, each elongate support of the plurality of elongate supports may comprise a plurality of LEDs or LED clusters located on a first side of the main body of each elongate support in the plurality of elongate supports. The main body may comprise a material that conducts heat such that during use at least a portion of the heat generated by each LED or LED cluster is transferred to the main body. Accordingly, during use heat may be transferred from each LED or LED cluster to the mean body and from the main body to gas flowing along the channel the main body of each elongate support within the plurality of elongate supports.

Therefore, the heat from the diode(s) of the plurality of LEDs or LED clusters may be used to increase the temperature of gas before it passes through each of the plurality of outlets. This allows the gas input to the apparatus during use to be cooler than the desired temperature of the gas surrounding the crop, thereby increasing the efficiency of cooling the plurality of LEDs or LED clusters The gas entering the at least one common manifold may be from 1° to 15° cooler than the temperature of gas surrounding the crop beneath the first face of the main body or each elongate support of the plurality of elongate supports. The gas entering the at least one common manifold may be from 1° to 10° cooler than the temperature of gas surrounding the crop beneath the first face of the main body or each elongate support of the plurality of elongate supports. For example, the temperature of the gas entering the at least one common manifold may be 1°, 2°, 3°, 4°, 5°, 6° or 7° cooler.

A temperature differential between the gas entering the common manifold and the gas flowing out of the plurality of outlets to the crops beneath during use may allow the level of humidity around a crop to be varied, for example.

In addition, the transfer of heat from the diode(s) of the plurality of LEDs or LED clusters to the main body thereby cools the diode(s) of the LED or LED cluster and may typically improve the efficiency of the LEDs and the lifetime of the LEDs compared to passive ambient cooling using traditional 'heat sinks', for example.

As the investment criteria for lighting systems is often based on a 10 year whole of life basis this is a very significant benefit. Furthermore, the heating provided by the LEDs allows the air introduced into the common manifold to be cooled such that the LEDs are cooled more efficiently due to the greater temperature gradient between the LED and the gas, whilst still allowing the gas flowing through the plurality of outlets to be at a suitable temperature for the organisms being grown using the apparatus.

By the term "LED cluster" we refer to multiple LEDs that are mounted onto a single printed circuit board (PCB) or that are mounted onto the main body together to produce the required mix of wavelengths of light.

The outlets of the plurality of outlets may be spaced regularly along the length of the main body. In embodiments comprising LEDs or LED clusters, the LEDs or LED clusters of the plurality of LED mounting points may be regularly spaced along the length of the main body.

In some embodiments comprising LEDs or LED clusters, the LEDs or LED clusters of the plurality of LEDs or LED clusters and the outlets of the plurality of outlets may alternate along the length of the main body. In some embodiments, the main body may comprise multiple outlets per LED or LED cluster. Accordingly, there may be two, three, four or more outlets per LED or LED cluster along the length of the main body. Alternatively, there may be multiple LEDs or LED clusters per outlet along the length of the main body. Accordingly, there may be two, three, four or more LEDs or LED clusters per outlet along the length of the main body.

In some embodiments comprising LEDs or LED clusters the distribution of LEDs or LED clusters along the main body may be independent of the distribution of outlets along the main body.

Typically, the plurality of outlets are configured to provide a uniform flow of gas. The flow rate may be varied to provide optimum conditions for the organism that is being grown below the main face. For example, if plants are being grown beneath the main body, the flow rate of gas from the plurality of outlets of each elongate support may be adjusted to ensure that the optimum temperature, humidity and supply of $CO_2$ is provided to those plants uniformly across the apparatus.

In some embodiments, the flow rate of gas from the plurality of outlets may be 100 m$^3$/hr, 150 m$^3$/hr, 200 m$^3$/hr, 250 m³/hr, 300 m³/hr, or 350 m³/hr. The flow rate may be the rate of gas flowing from the outlets of the plurality of elongate supports.

In some embodiments, the flow rate of gas from the plurality of outlets may be 10 m³/hr, 20 m³/hr, 30 m³/hr, or 40 m³/hr. The flow rate may be the rate of gas flowing from each elongate support.

The gas that flows through the apparatus during use may be air, or enriched air.

By the term "enriched air" we refer to air that has been modified in some way to become more conducive to efficient growth. Enriched air may have the components of standard air modified. For example, enriched air may have a higher $CO_2$ content than standard air where the apparatus is used in a system to grow plants, a modified humidity from standard air, or a lower oxygen content than standard air. In another example, enriched air may have a higher oxygen content than standard air where the apparatus is used in a system used to grow fungi or insects.

The plurality of outlets may be arranged along the main body such that the gas flow produced to organisms beneath the first side of the main body is substantially uniform. For example, where the organisms beneath the first side are plants, the gas flow may be such that each plant will receive substantially the same supply of $CO_2$.

It will be appreciated by the person skilled in the art that the distribution of outlets along the main body may be varied depending on the system within which apparatus is to be used. For example, the distance between the main body of each elongate support within the plurality of elongate supports and the plants beneath the first side will impact the maximum separation between outlets if a substantially uniform air flow over the plants is to be achieved.

In embodiments comprising a plurality of LEDs or LED clusters, the plurality of LEDs or LED clusters along the main body may be configured to provide uniform lighting to plants located beneath the first side of the main body of each elongate support within the plurality of elongate supports. Accordingly, the distribution of the plurality of LEDs or LED clusters is such that each plant beneath the first side receives substantially the same wavelengths of light at the same intensity from the plurality of LEDs or LED clusters.

It will be appreciated by the person skilled in the art that the distribution of the LEDs or LED clusters along the main body may be varied depending on the requirements of the system within which the apparatus is to be used. For example, the distance between the apparatus and the plants beneath the first side will impact the maximum separation between LEDs or LED clusters if uniform lighting is to be achieved.

In some embodiments, the LEDs or LED clusters of the plurality of LEDs or LED clusters may be in direct contact with the main body. Accordingly, the main body may be acting as a heat sink for the LEDs or LED clusters of the plurality of LEDs or LED clusters. In other words, during use, direct transfer of at least a portion of the heat generated by the plurality of LEDs or LED clusters to the main body may cool the plurality of LEDs or LED clusters.

In some embodiments, the LEDs or LED clusters may be mounted onto a printed circuit board (PCB) and the PCB may be in direct contact with the main body. A thermally conducting medium may couple the PCB and the main body, or the PCB may contact the main body directly. Accordingly, heat generated by the LED or LED cluster may be transferred to the PCB and that heat, or a portion of that heat, may be transferred to the main body.

The apparatus of the present aspect provides multiple functions. In embodiments comprising LEDs or LED clusters, the elongate support provides a physical support for the LEDs or LED clusters, distributes a gas, such as air/$CO_2$, to plants or other organisms grown in systems comprising the apparatus, and using that gas flow within the main body to cool the LEDs or LED clusters.

Accordingly, the provision of an apparatus that combines all of these functions greatly simplifies the system, thereby providing increased efficiency and reducing space requirements and costs. In addition, the use of the main body to effectively heat sink the plurality of LEDs or LED clusters increases the efficiency and/or lifetime of the plurality of LEDs or LED clusters.

The apparatus may comprise two or more common manifolds. For example, the apparatus may comprise two common manifolds, a first common manifold and a second common manifold. Each elongate support in the plurality of elongate supports may comprise two inlets, a first inlet and a second inlet. The first inlet of each elongate support may be in fluid communication with the first common manifold. The second inlet of each elongate support may be in fluid communication with the second common manifold. Accordingly, during use, gas may flow into one or both of the first and second common manifolds from an external source and into each inlet of each elongate support. As a result, the pressure of gas within each elongate support may be substantially equalised along the length of the main body of each elongate support, and therefore, the rate of flow of gas out of each outlet is substantially uniform. The first and second common manifolds may be in fluid communication with one another via at least one connecting manifold, and the first common manifold comprises an inlet that allows gas from an external source to flow into the first common manifold and into the second common manifold via the connecting manifold such that the pressure of gas in the first common manifold and the second common manifold is substantially the same. Alternatively, each of the first and second common manifolds may comprise an inlet through which gas may flow into the apparatus.

In some embodiments, the first inlet of each elongate support is at a first end of the main body and the second inlet is at a second end of the main body. Accordingly, each elongate support may span between the first and second common manifolds.

The plurality of elongate supports may be arranged in a common plane. Accordingly, the apparatus may be suitable to be mounted onto a planar or substantially planar surface.

The plurality of elongate supports may be arranged in a grid. For example, in embodiments where each elongate support comprises one inlet, the inlets of the elongate supports may be arranged in a planar grid and the elongate supports may extend away from the plane of the planar grid.

According to a second aspect of the invention there is provided an apparatus for use in indoor agriculture, the apparatus comprising a hollow main body, the hollow main body comprising a first side, at least one inlet, and a plurality of outlets in the first side, the hollow main body configured to allow gas to flow into the at least one inlet during use, through the hollow main body and out of the plurality of outlets, such that a uniform flow of gas is provided adjacent the first side of the main body during use.

The cross-sectional area of the hollow main body may be significantly larger than that of each outlet of the plurality of outlets.

In some embodiments, the hollow main body comprises a plurality of LEDs or LED clusters located on the first side of the hollow main body.

The hollow main body may comprise a metallic material. For example, the hollow main body may comprise copper, brass, iron, steel, aluminium, or similar. Preferably, the hollow main body comprises aluminium.

Typically, the outlets of the plurality of outlets are spaced regularly across the first side of the hollow main body.

In some embodiments comprising a plurality of LEDs or LED clusters, the LEDs or LED clusters of the plurality of LEDs or LED clusters are spaced regularly across the first side of the hollow main body.

Typically, the plurality of outlets are configured to provide an optimal flow rate of gas.

In some embodiments comprising a plurality of LEDs or LED clusters, the LEDs or LED clusters of the plurality of LEDs or LED clusters may be in direct contact with the hollow main body. Accordingly, the hollow main body may be acting as a heat sink for the LEDs or LED clusters of the plurality of LEDs or LED clusters. In other words, during use, transfer of at least a portion of the heat generated by the plurality of LEDs or LED clusters to the hollow main body may cool the plurality of LEDs or LED clusters.

The LEDs or LED clusters may be mounted onto a printed circuit board (PCB) and the PCB may be in direct contact with the hollow main body. A thermally conducting medium may couple the PCB and the hollow main body, or the PCB may contact the hollow main body directly. Accordingly, heat generated by each LED or LED cluster may be transferred to the PCB and that heat, or a portion of that heat, may be transferred to the hollow main body.

During use, transfer of at least a portion of the heat generated by the plurality of LEDs or LED clusters to the main body may cool the plurality of LEDs or LED clusters.

In some embodiments, the flow rate of gas from the plurality of outlets may be 100 $m^3$/hr, 150 $m^3$/hr, 200 $m^3$/hr, 250 $m^3$/hr, 300 $m^3$/hr, or 350 $m^3$/hr.

It will be appreciated by the person skilled in the art that the distribution of outlets across the hollow main body may be varied depending on the system within which apparatus is to be used. For example, the distance between the hollow main body and the plants beneath the first side will impact the maximum separation between outlets if a substantially uniform air flow over the plants is to be achieved.

In embodiments comprising LEDs or LED clusters, the distribution of the plurality of LEDs or LED clusters across the hollow main body may be configured to provide uniform lighting to plants located beneath the first side of the hollow main body. Accordingly, the distribution of the plurality of LEDs or LED clusters is such that each plant beneath the first side receives substantially the same wavelengths of light at the same intensity from the plurality of LEDs or LED clusters.

It will be appreciated by the person skilled in the art that the distribution of the LEDs or LED clusters across the hollow main body may be varied depending on the requirements of the system within which the apparatus is to be used. For example, the distance between the apparatus and the plants beneath the first side will impact the maximum separation between LEDs or LED clusters if uniform lighting is to be achieved.

The invention extends in a third aspect to a system comprising a plurality of growth trays, wherein the underside of each growth tray accommodates an apparatus according to the first aspect or second aspect.

Typically, the system is used for growing organisms such as plants, fungi, or insects, for example, in an indoor environment. In indoor agriculture it is important that space is used as efficiently as possible to maximise profitability per unit of floor space.

Accordingly, in preferred embodiments, the system comprises a plurality of growth trays arranged in at least one stack, wherein gas flowing from the plurality of outlets of the apparatus of a first growth tray in the plurality of growth trays is directed to a second growth tray beneath it in the stack.

In some embodiments where the apparatus comprises LEDs or LED clusters, light emitted from the plurality of LEDs or LED clusters of each apparatus of a first growth tray in the plurality of growth trays is directed to a second growth tray beneath it in the stack.

The provision of a stack of growth trays according to the present aspect allows multiple layers of plants, for example, to be grown in a given area, thereby increasing the density of plants that can be grown in a given area, and therefore, increasing the efficiency of the system.

Typically, the growth trays within a stack of growth trays may be separated from on another by from 80 mm to 1500 mm, from 80 mm to 1000 mm or from 100 mm to 500 mm, for example.

In some embodiments, the system may comprise a pump connected to an inlet of the or at least one of the common manifold of each growth tray such that a gas may be pumped during use from the pump to the plurality of outlets of the apparatus via the inlet of the or at least one common manifold of each apparatus according to the first aspect or second aspect.

Typically, the gas that is pumped during use is air, or enriched air.

By the term "enriched air" we refer to air that has been modified in some way to become more conducive to efficient growth. Enriched air may have the components of standard air modified. For example, enriched air may have a higher $CO_2$ content than standard air where the system is used to grow plants in the at least on growth tray, a modified humidity from standard air, or a lower oxygen content than standard air. In another example, enriched air may have a higher oxygen content than standard air where the system is used to grow fungi or insects.

In some embodiments, the pump may be part of an air conditioning unit that is configured to adjust the temperature and/or humidity and/or composition of the gas that is pumped through the or each apparatus during use.

In embodiments where the system comprises apparatus according to the first aspect, each elongate support of the plurality of elongate supports may be associated with a specific growing zone. A growing zone may be the entirety of a growth tray, or a plurality of growth trays.

Alternatively, a growing zone may be a portion of a growth tray, and each elongate support may be associated with a different or the same growing zone.

In some embodiments where the system comprises apparatus according to the first aspect, the rate of gas flow, temperature, humidity and/or $CO_2$ concentration can be varied for each elongate support and thus for each area of plant growth or growing zone. For example, each elongate support may be associated with its own valve, thereby allowing the flow of gas from the at least one common manifold to the elongate support to be controlled for each elongate support within a plurality of elongate supports.

In some embodiments, the rate of gas flow, temperature, humidity and/or $CO_2$ concentration can be varied for the or each common manifold that comprises an inlet. For example, in embodiments where one common manifold comprises an inlet, that inlet may comprise a valve that can be independently controlled, such that the rate of flow of gas into each growth tray may be varied.

In embodiments where the apparatus comprises LEDs or LED clusters, the wavelength and/or intensity of light emitted by the plurality of LEDs or LED clusters may be varied. The wavelength and/or intensity of light emitted by the plurality of LEDs or LED clusters may be varied per growth tray.

The ability to vary lighting by wavelength and intensity combined with the precise control of water and nutrition enables total controlled environment agriculture (TCEA). The addition of sensors and cameras to measure plant yield and quality in real time allows feedback loops to be introduced at the individual plant or group of plants level, for example. Further, the ability to change these independently allows artificial intelligence to optimise the system.

According to a fourth aspect there is provided a system for growth comprising apparatus according to the first aspect, wherein the plurality of elongate supports are arranged in an array of columns and rows, wherein the elongate supports of a given row and/or column are connected to at least one common manifold, and the rows of elongate supports are arranged in a stack one above the other.

The system may be configured such that a frame comprising growth trays may be moved into the system such that a growth tray is located beneath a row of elongate supports. For example, the frame may be a trolley and the growth trays may be located on the shelves of the trolley.

According to a fifth aspect of the invention there is provided the use of the system of the third aspect or fourth aspect to grow plants in an indoor environment.

The invention extends in a sixth aspect to the use of the system of the third aspect or fourth aspect to grow fungi in an indoor environment.

Typically, in embodiments where the system according to the third aspect is used, the growth trays of the system do not comprise LEDs or LED clusters. However, in some embodiments the growth trays may comprise LEDs or LED clusters but such LEDs and LED clusters are not utilised. For example, this may be useful if the system is to be used to grow plants and then later to grow mushrooms, or if a first group of growth trays of the system is to be used to grow plants and a second group of growth trays of the system is to be used to grow mushrooms Preferred and optional features of the first aspect are preferred and optional features of the second aspect where appropriate.

BRIEF DESCRIPTION OF THE FIGURES

Embodiments of the present invention will now be described, by way of non-limiting example, with reference to the accompanying drawings.

DETAILED DESCRIPTION

Figure 1:
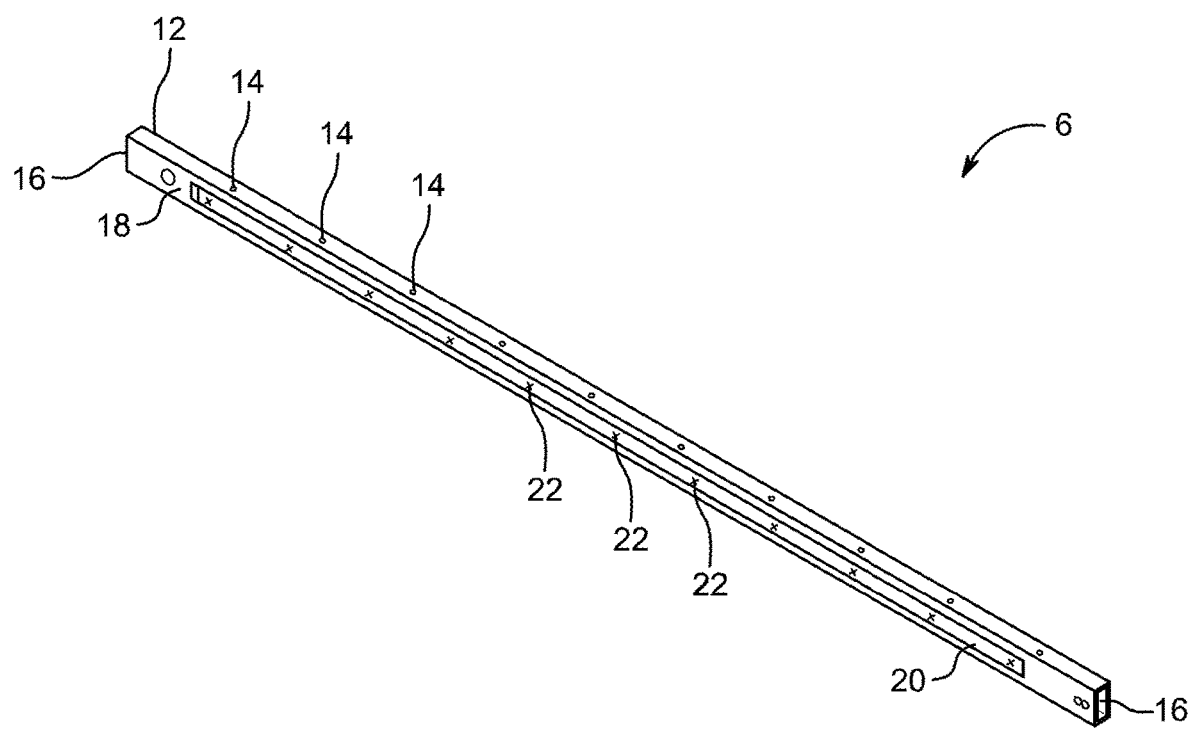
FIG. 1: A perspective view of an elongate support according to an embodiment.
Figure 2:
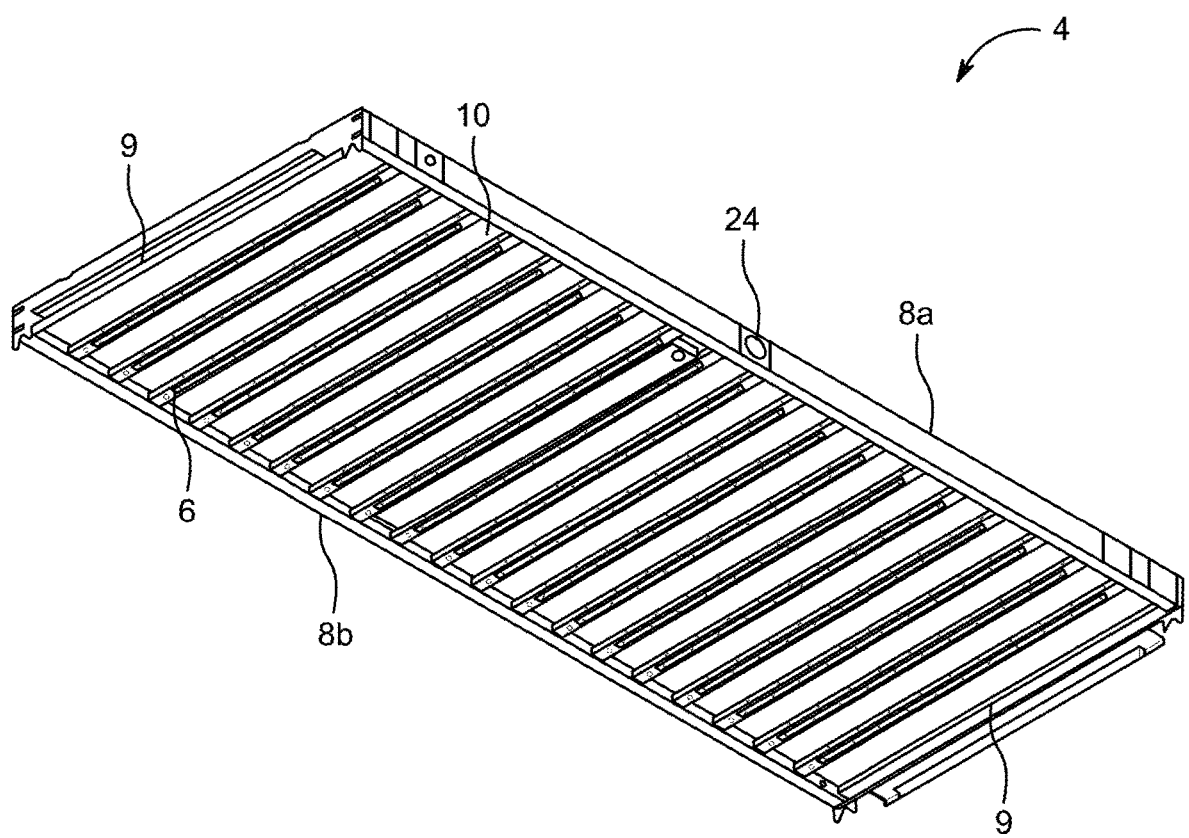
FIG. 2: A perspective view from below of a growth tray according to an embodiment comprising a plurality of elongate supports.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Example 1—Plant Growth Tower

With reference to FIGS. 1 to 3, 5 and 6, a growing system 1 comprises two stacks 2 of growth trays 4 mounted within a frame 5. Each growth tray 4 comprises supports 6 (acting as elongate supports), a first plenum 8a and a second plenum 8b (acting as first and second common manifolds respectively), two connecting plenums 9 connecting the first plenum 8a and second plenum 8b, and a plant support 10. The plant support 10 is a sheet of material extending above the supports 6 and supports plants that are grown on the growth tray 4 during use. In addition, the plant support provides a barrier between growth trays such that the environment of each growth tray is isolated from that of adjacent growth trays.

Each support 6 comprises an aluminium hollow section 12 (acting as a main body) having a cross section of 50 mm by 25 mm, within which a series of 5 mm diameter apertures 14 (acting as a plurality of outlets) are defined on the side walls of the hollow section. At each end of the hollow section 12 is an inlet 16. Along a main face 18 of the hollow section 12 is mounted a printed circuit board (PCB) 20 comprising an array of LED clusters 22. Each LED cluster 22 comprises five LEDs. The PCB 20 is wired to a power supply (not shown) such that power may be provided to the LED clusters 22, and the output of the LED clusters 22 may be controlled.

Figure 6:
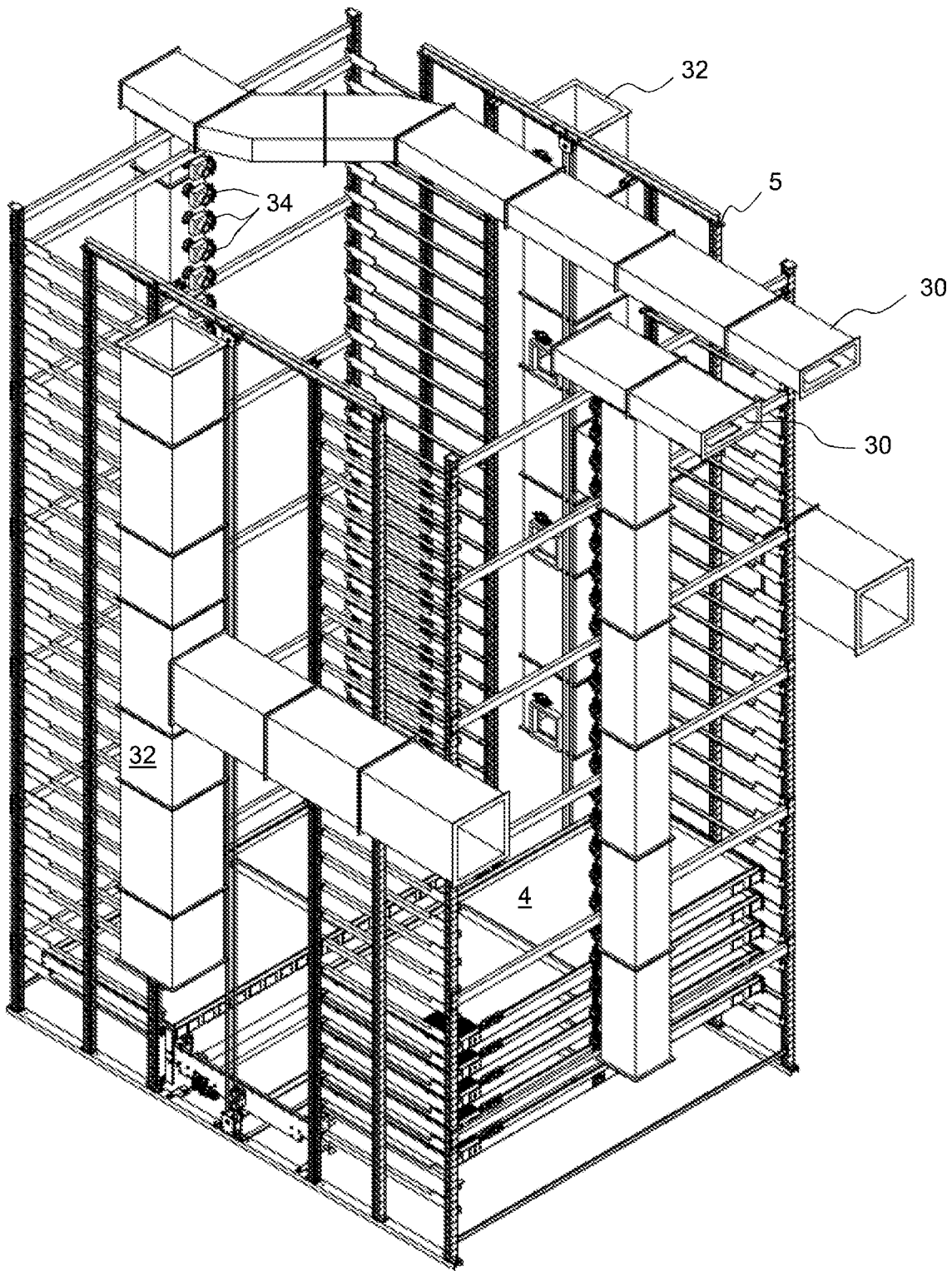
FIG. 6: is a perspective side view of a partially constructed system according to an embodiment with inlet and extract ducts.

The first plenum 8a comprises an inlet 24. The inlet 24 of the first plenum 8a of each growth tray 4 is connected to a heating ventilation and cooling system (HVAC) (not shown) via ducting. As shown in FIG. 6, the inlet 24 of each first plenum 8a is connected to inlet ducting 30. Air is extracted from the growth trays using extraction ducts 32 on the frame in between the two stacks of growth trays. The inlet ducting 30 comprises a series of valves 34, each valve in the series of valves 34 being associated with the inlet 24 of a first plenum 8a of a growth tray 4.

The first growth tray in a stack is separate from the growth tray beneath it by 380 mm. However, it will be appreciated that the growth tray to growth tray separation may be varied to accommodate different crops and different stages of growth of the crops.

The HVAC system controls temperature and humidity of the air that is delivered to the aluminium sections and ventilation holes during use.

Air within the HVAC system is sterilized by exposure to ultra violet radiation to ensure that the growth system is free or substantially free of foreign bodies such as bacteria or fungi to prevent disease in the plants being grown in the system.

The rate of air flow onto each growth tray provides a positive pressure such that air does not enter each tray from outside the HVAC system. Accordingly, foreign bodies do not typically enter the growth system from outside, and so only sterile or substantially sterile air surrounds the plants being grown in the growth system. Therefore, fewer plants need to be discarded or removed from the system due to disease etc. and the crop produced by the growth system is therefore greater than might otherwise be the case.

Figure 3:
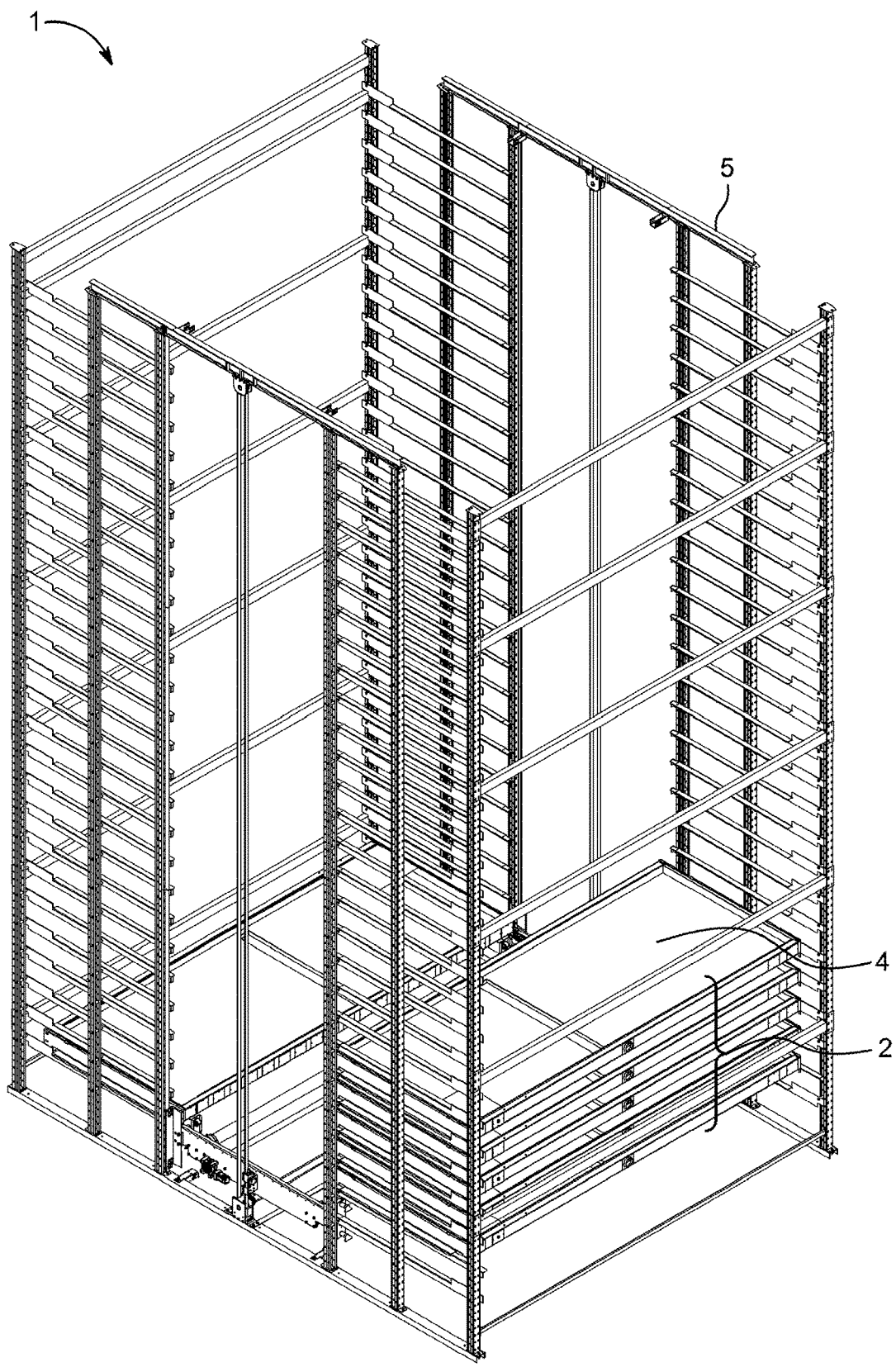
FIG. 3: A perspective view of a partially constructed system according to an embodiment comprising two stacks of growth trays.
Figure 4:
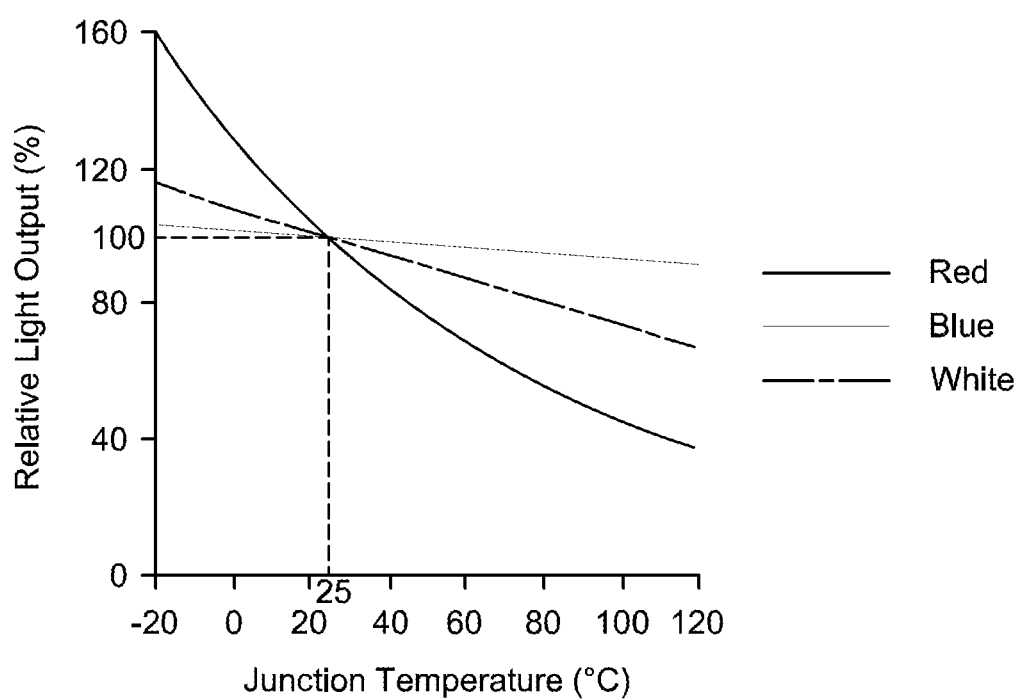
FIG. 4: Relative light output of red, blue and phosphor-converted white LEDs as a function of the junction temperature (Data normalised to 100% at a junction temperature of 25° C.)
Figure 5:
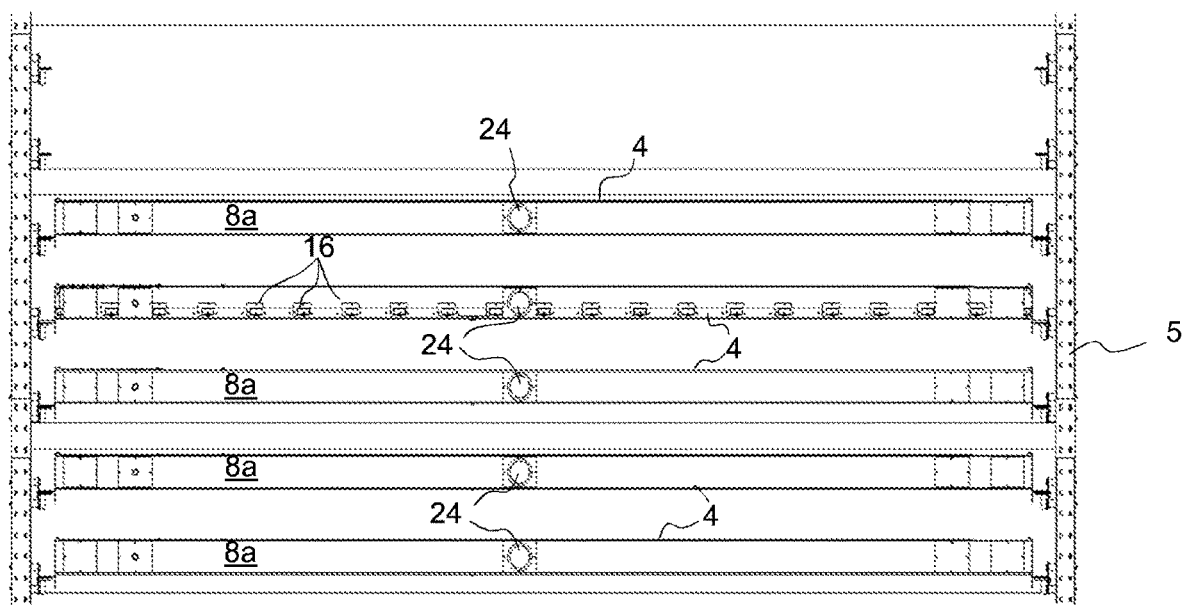
FIG. 5: is a side view of a stack of growth trays.

During use and with reference to FIGS. 3 and 6, plants are mounted onto the plant supports of each growth tray, and the growth trays installed within the frame 5 in two stacks. Accordingly, the plants of the top growth tray of each stack are out in the open, and the plants of the subsequent growth trays are underneath the preceding growth tray in the stack. Accordingly, with the exception of the top growth trays, light and air is provided to the plants by the LED clusters 22 and the apertures 14 in the supports 6 of the growth tray 4 above it in the stack.

As the requirements of any given plant is provided by the growth tray above it in the stack, the system of the present invention is very compact. Furthermore, the system of the present invention provides uniform, or substantially uniform levels of light and supply of $CO_2$ to the plants across the growth tray, and between growth trays, if required, thereby providing an efficient way of growing plants indoors.

As an additional benefit, the air flow through the supports cools the LEDs of the supports, providing both an increase in efficiency and lifetime for the LEDs themselves, but also heats the air that is provided to the plants, thereby saving energy.

Example 2—Plant Growth Array

Figure 7:
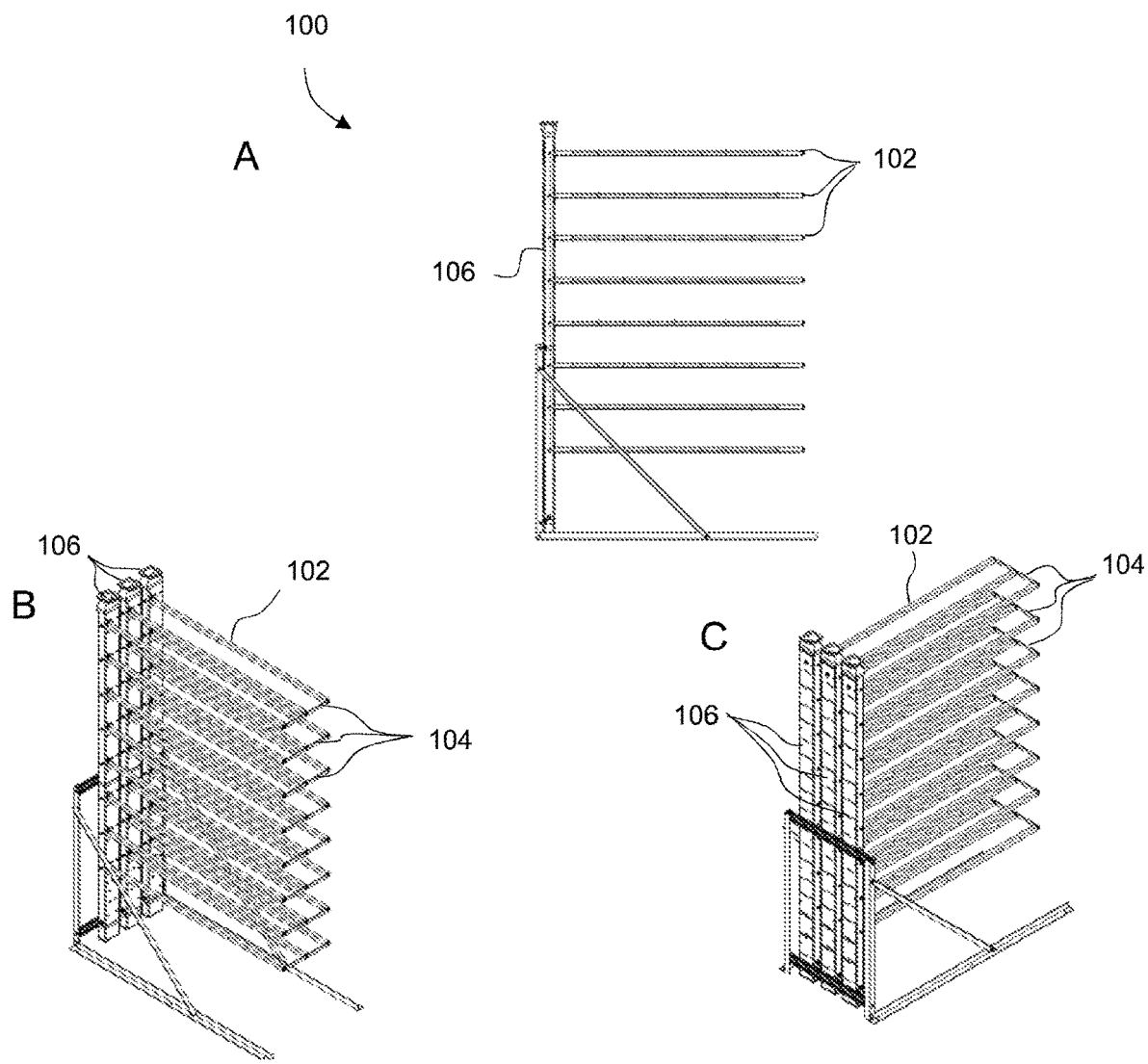
FIG. 7: is A) a side view, B) a perspective side view and C) a perspective back view of a growth system according to an embodiment.
Figure 8:
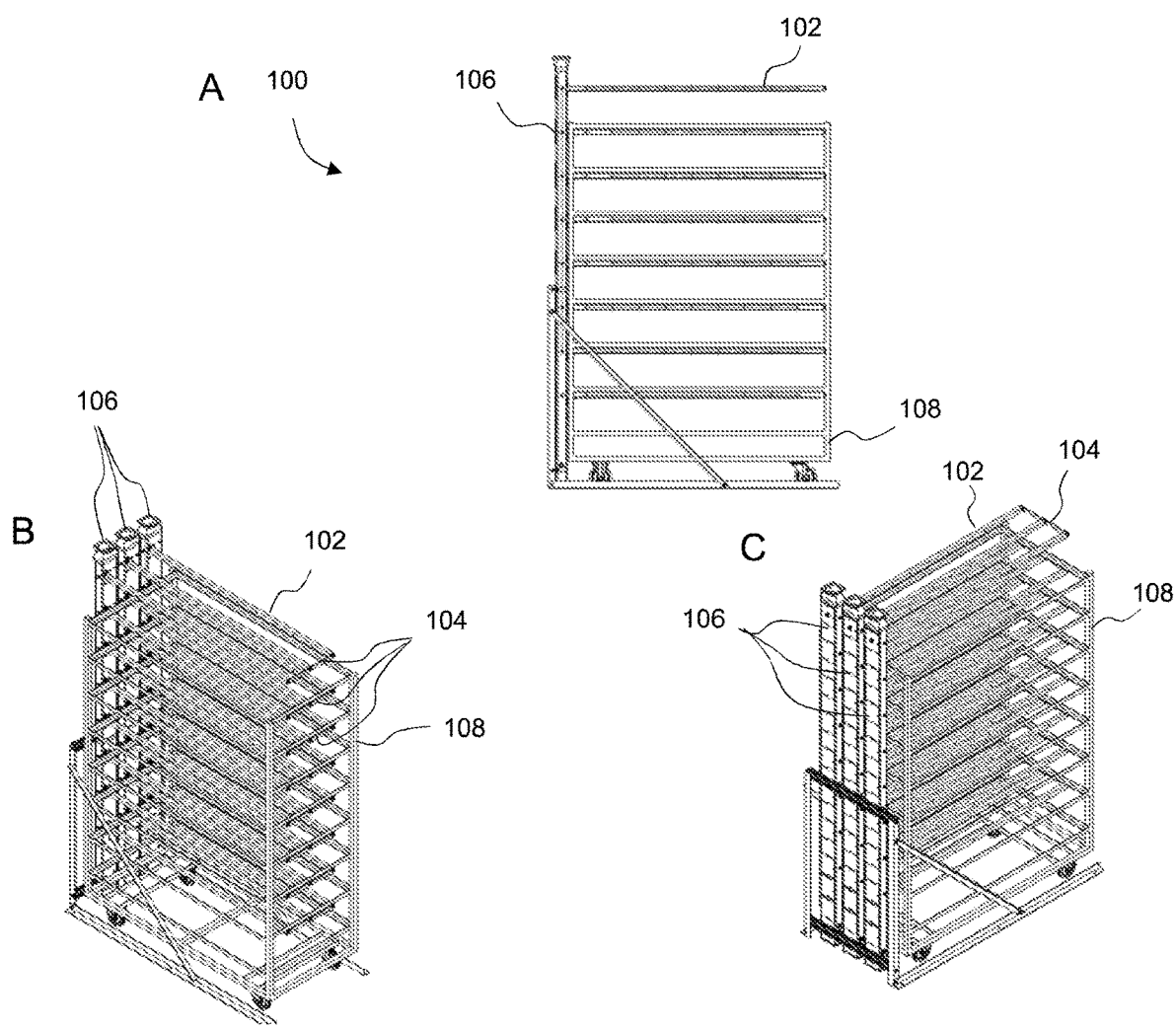
FIG. 8: is A) a side view, B) a perspective side view and C) a perspective back view of a growth system according to an embodiment plus trolley.

With reference to FIGS. 7 and 8 a growing system 100 comprises supports 102 (acting as elongate supports) arranged in an array of columns and rows, each support within a given row is connected to one another via a bracket 104. On a first side of the supports 102 a common plenum 106 connects each support 102 within a column of supports such that each support 102 within a column of supports is in fluid communication with the common plenum 106. The common plenum 6 connects to ducting that allows air from an HVAC system to be pumped into the plurality of supports.

Each support corresponds to a support as described in the first example above.

As will be noted, the second side of plurality of supports does not comprise any vertical framework. As a result, a trolley 108 carrying trays (not shown) can be inserted into the growing system such that the supports of a given row of the array are arranged above a tray carried on the trolley 108. Accordingly, light emitted by the LEDs of the supports is directed onto plants growing on the trays beneath the supports of a given row of supports, and air flowing out of the outlets of the supports is directed down onto the plants growing on the trays.

When plants need to be removed from the system for harvesting, or maintenance, for example, the trolley is simply removed from the system and the trays carried on the trolley are thereby slid out from beneath the supports of each row of supports and taken out of the system.

Alternative Growing Systems

In an alternative of either of the above examples, the inlet of each support comprises a valve that is independently controllable such that the rate of gas flow through the valve and therefore the gas flow can be varied from one support to another.

In a further alternative of either of the above examples, the inlet of each plenum comprises a valve that is independently controllable such that the rate of gas flow through the valve of the plenum, and therefore the growth tray of which the plenum is a part, may be varied. Accordingly, the rate of gas flow through a first tray in a stack of growth trays may be different to the rate of gas flow through a second tray within the same stack.

In an alternative of either of the above examples the system is used to grow mushrooms. Accordingly, mushrooms are planted on each growth tray and the gas supplied to each tray is an oxygen rich air. LEDs are not necessary for the growth of mushrooms as mushrooms do not photosynthesize and therefore do not need light to grow. Accordingly, either the LEDs of each growth tray are not used, or the supports of each tray do not comprise LEDs.

In a still further alternative example, the system described in either Example 1 or Example 2 comprises growth trays comprising panels rather than a plurality of supports arranged on the underside of the growth trays, the panels comprising an array of LED clusters and an array of outlets.

The invention claimed is:

1. A growth tray comprising an apparatus disposed on an underside of the growth tray, the apparatus comprising:
    a plurality of elongate supports connected to at least one common manifold providing structural support to the growth tray, wherein each elongate support within the plurality of elongate supports comprises:
        a main body having a first side and comprising a metallic material;
        at least one inlet in fluid communication with the at least one common manifold;
        a plurality of outlets arranged on a side wall of the main body adjacent to the first side;
        a plurality of light emitting diodes (LEDs) or LED clusters located on the first side of the main body of each elongate support in the plurality of elongate supports in direct contact with the main body; and
        a channel within and extending along substantially a length of the main body between the at least one inlet and the plurality of outlets,
    wherein the at least one common manifold configured to allow gas to flow into the at least one inlets of the plurality of elongate supports, and
    wherein the apparatus is configured such that during use, gas may flow from the common manifold to the at least one inlet of each elongate support within the plurality of elongate supports, through a channel of each elongate support and out of the plurality of outlets of each elongate support, such that a uniform flow of gas is provided adjacent the first side of the main body during use.

2. The growth tray of claim 1, wherein a cross-sectional area of the channel of the main body is significantly larger than that of each outlet of the plurality of outlets.

3. The growth tray of claim 1, wherein at least one of the at least one common manifold comprises an inlet.

4. The growth tray of claim 3, wherein the inlet of one of the at least one common manifold is associated with a control valve.

5. The growth tray of claim 1, wherein the main body comprises aluminium.

6. The growth tray of claim 1, wherein the outlets of the plurality of outlets are spaced regularly along the length of the main body.

7. The growth tray of claim 1, wherein the LEDs of the plurality of LEDs are spaced regularly along the length of the main body.

8. The growth tray of claim 1, wherein the main body is tubular.

9. The growth tray of claim 8, wherein a cross-section of the main body is substantially circular, elliptical or rectangular.

10. The growth tray of claim 1, wherein the plurality of outlets are configured to provide an optimal flow rate of gas.

11. The growth tray of claim 1, wherein, during use, transfer of at least a portion of heat generated by the plurality of LEDs or LED clusters to the main body cools the plurality of LEDs or LED clusters.

12. An apparatus for use in indoor agriculture, the apparatus comprising a hollow main body the hollow main body comprising a first side and a second side adjacent to the first side, at least one inlet, a plurality of light emitting diodes (LEDs) or LED clusters located on the first side, and a plurality of outlets in the second side, the hollow main body configured to allow gas to flow into the at least one inlet during use, through the hollow main body and out of the plurality of outlets, such that a uniform flow of gas is provided adjacent the first side of the main body during use.

13. The growth tray according to claim 1, wherein the growth tray and at least another one of the growth trays are configured to be stacked in in a vertical tower.

14. The growth tray according to claim 1, wherein during use the gas may flow to plants supported within a second growth tray arranged below the growth tray.

* * * * *